(12) United States Patent
Sherlock

(10) Patent No.: US 7,016,402 B2
(45) Date of Patent: Mar. 21, 2006

(54) DIGITAL SUBSCRIBER LINE MODEM WITH AUTOMATED LINE CONNECTION

(75) Inventor: Ian J. Sherlock, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 889 days.

(21) Appl. No.: 09/919,429

(22) Filed: Jul. 31, 2001

(65) Prior Publication Data

US 2002/0018521 A1    Feb. 14, 2002

Related U.S. Application Data

(60) Provisional application No. 60/221,952, filed on Jul. 31, 2000.

(51) Int. Cl.
    *H04B 1/38* (2006.01)
(52) U.S. Cl. .................................................... 375/222
(58) Field of Classification Search ................ 375/222,
    375/219, 224, 228, 295, 316, 257, 377, 259;
    324/415, 76.11, 95, 96; 327/1; 340/146.2,
    340/531; 455/73, 91, 560, 550.1, 115.1;
    379/26.01, 27.01, 399.01, 413.02–413.04,
    379/93.28–93.29, 93.31–93.36, 93.05, 93.01,
    379/399.02, 398; 370/359, 389, 419, 420,
    370/421, 241, 93.28–93.36, 93.01, 93.05,
    370/399.01, 399.02, 398, 351
    See application file for complete search history.

(56) References Cited

U.S. PATENT DOCUMENTS 5,001,755 A * 3/1991 Skret ............................ 380/46

| 5,815,505 A | | 9/1998 | Mills |
| 5,905,781 A | | 5/1999 | McHale et al. |
| 6,014,431 A | * | 1/2000 | McHale et al. ........... 379/93.14 |
| 6,349,096 B1 | * | 2/2002 | Liu et al. ..................... 370/352 |
| 6,744,883 B1 | * | 6/2004 | Bingel et al. ........... 379/399.01 |
| 6,826,174 B1 | * | 11/2004 | Erekson et al. ............. 370/352 |

FOREIGN PATENT DOCUMENTS

EP            0 806 852 A2    11/1997

* cited by examiner

*Primary Examiner*—Mohammed Ghayour
*Assistant Examiner*—Pankaj Kumar
(74) *Attorney, Agent, or Firm*—Abdul Zindani; W. James Brady, III; Frederick J. Telecky, Jr.

(57) ABSTRACT

A DSL modem (50). The DSL modem includes a connector (62) comprising a first pair of conductors ($IP_1$, $IP_2$) and a second pair of conductors ($OP_1$, $OP_2$). The DSL modem further includes both circuitry for transmitting according to a DSL protocol (52) and circuitry for receiving according to a DSL protocol (52). Still further, the DSL modem includes switching circuitry (60) operable to selectively switch to a first position to couple the circuitry for transmitting and the circuitry for receiving to the first pair of conductors and to a second position to couple the circuitry for transmitting and the circuitry for receiving to the second pair of conductors. Lastly, the DSL modem includes circuitry (52, CONTROL) for controlling the switching circuitry to switch to one of the first position and the second position and for then detecting whether DSL service exists along the pair of conductors to which the circuitry for transmitting and the circuitry for receiving is then coupled.

20 Claims, 5 Drawing Sheets

DIGITAL SUBSCRIBER LINE MODEM WITH AUTOMATED LINE CONNECTION

This application claims priority under 35 USC § 119(e)(1) of provisional application Ser. No. 60/221,952, filed Jul. 31, 2000.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to digital subscriber line ("DSL") technology, and are more particularly directed to a DSL modem operable to efficiently connect to DSL services in existing telephone service connectors.

The exchange of digital information between remotely located computers is now a pervasive part of modem computing and occurs in all sorts of computer contexts including business, education, and personal use. Such uses by all current predictions appear to be even more desirable in the future. Video on demand ("VOD") is one area which has for some time driven the advancement of technology in this area. More recently, the rapid increase in use and popularity of the Global Internet hereafter, the "Internet") has perhaps surpassed the excitement created by VOD.

One type of technology arising from the above and continuing to evolve is referred to in the art as digital subscriber line or DSL. DSL is a public network technology that delivers relatively high bandwidth over conventional telephone company copper wiring at limited distances. DSL has been further separated into several different categories, where the differing DSL categories are currently developing, some at different rates than others. This evolution prevents an absolute definition of certain DSL categories, but some observations may be made at the current time. Generally with respect to the various DSL technology categories, each differs in some respects while each also shares some similarities. As to differences of the DSL categories, they may diverge in one or more of the expected data transfer rate, the medium type and length over which data are communicated, and the scheme for encoding and decoding data for communication. As to the similarities of the DSL technologies, generally speaking each DSL system is provisioned into modem pairs. One modem of the modem pair is located at a customer site. The other modem of the modem pair is located at the site of an owner, or controller, of a twisted conductor pair network. Currently, the most evident owner or controller is a telephone company central office. Within the telephone company system, its modem is connected to communicate with some type of network, often referred to as a backbone network. The backbone network is further coupled in a network manner to provide other communication paths to and from the backbone network. Given its network nature, the backbone network may further communicate with other information sources and, most notably under current technology, with the Internet. Thus, information accessible to the backbone network, such as Internet information, may be communicated between the central office DSL modem and a customer site with its own compatible DSL modem. Within this general system, it is also anticipated that data rates between DSL modems may be far greater than current voice modem rates. Indeed, current DSL systems being tested or projected range in rates on the order of 500 Kbps to 18 Mbps, or even faster. The higher rates for some DSL systems are only for so-called downstream communications, that is, from the central office to the customer site; thus, for those systems, communication in the other direction (i.e., upstream from the customer site to the central office) is generally at a rate considerably lower than the downstream rate. Lastly, note that most DSL technologies do not use the whole bandwidth of the twisted wire pair, and they often reserve low bandwidth for a voice channel. As a result, while a line is being used by a DSL system, the same line may concurrently communicate a voice conversation as well.

Briefly looking at perhaps the most publicized DSL technology currently being developed, it is referred to as Asymmetric Digital Subscriber Line, or "ADSL." ADSL has been standardized by ANSI as seen by its T1.413 standard. However, even given that standard, there continues to be debate and competition as to whether devices complying with the standard provide promise for future wide scale use, and indeed whether the standard requires revision. For example, the standard currently contemplates a modulation technology called Discrete Multitone (DMT) for the transmission of high speed data, but more recently it has been urged that the standard further include an alternative data transmission technique referred to as carrierless amplitude/phase modulation (CAP). In any event, given the state of the art discussion of ADSL systems, it is contemplated that they will communicate over a single copper twisted wire pair, and provide downstream rates on the order of 1.5 Mbps to 9 Mbps, while upstream bandwidth will range from 16 kbps to 1 Mbps. Along with Internet access, telephone companies are considering delivering remote local area network ("LAN") access and VOD services via ADSL.

As to other DSL categories being developed, they include High-Bit-Rate Digital Subscriber Line ("HDSL"), Symmetrical Digital Subscriber Line ("SDSL"), and Very-high-data-rate Digital Subscriber Line ("VDSL"). HDSL, unlike ADSL as described above, has a symmetric data transfer rate, that is, it communicates at the same speed in both the upstream and downstream directions. Current perceived speeds are on the order of 1.544 Mbps of bandwidth, but require two copper twisted wire pairs. HDSL's operating range is more limited than that of ADSL, and is currently considered to be effective at distances of approximately 12,000 feet. Beyond such a distance, HDSL communication requires signal repeaters to extend the service. SDSL delivers a comparable speed and also a symmetric data transfer as compared to HDSL, but achieves these results with a single copper twisted wire pair. However, the operating range of an SDSL system is limited to approximately 10,000 feet. Lastly, VDSL provides asymmetric data transfer rates, but anticipates much higher speeds than those competing DSL technologies described above. Currently, rates over a single twisted copper pair on the order of 13 Mbps to 52 Mpbs downstream, and 1.5 Mbps to 2.3 Mbps upstream, are contemplated. Note, however, that such rates are expected to operate only over a range of 1,000 to 4,500 feet.

Having introduced DSL technology, attention is now directed to the implementation of that technology at the consumer level. Under the current and typical scenario, when a consumer wants DSL capability in his or her computer, the consumer contacts a DSL provider (e.g., the local telephone company). The DSL provider then sends a representative to the location specified by the consumer and connects a DSL modem to the consumer's computer. More particularly under contemporary implementations, an external DSL modem is connected to the consumer's computer, such as by coupling the external DSL modem to a network interface card ("NIC") located internally within the computer. Alternative couplings also may be used or are currently being developed (e.g., use of the Universal Serial Bus ("USB")). The DSL modem is also then coupled to the telephone wiring in the location of the computer, such as to the well-known RJ11 connectors used in business and residential locations for voice telephones. Further, the installation also may involve some additional wiring at the outside of the home or business, that is, where the telephone company's wiring connects to the location (e.g., via a network interface device ("NID")) as is further explored later. In any event, at the present time an installation of a DSL modem commonly requires a person, such as a telephone company representative, who has a considerable level of technical expertise.

Recalling from above that a DSL modem is typically connected to an RJ11 connector in a home or business, the present embodiments are directed to increasing the chance of proper signal communications when this connection is made. Specifically, an RJ11 connector, as known in the art, includes six cavities aligned in a row, where a conducting pin may be placed within each such cavity; in the majority of home applications, the two outermost of these six cavities are left empty, while the remaining four cavities between those outermost cavities each retain a corresponding conductor pin. Unless stated otherwise, for the sake of a consistent example for the remainder of this document the example of four pins used in the RJ11 connector are described. Thus, in both the RJ11 female receptacle and male plug, these four pins are aligned in a row. The two pins at the ends of the row are referred to in the art as an outer pair, whereas the two pins located along the row and between the outer pair are referred to in the art as the inner pair. Further, a typical voice telephone cable includes two twisted wire pairs of conductors. Often, to support a single telephone line in a home or business and according to the known "plain ordinary telephone service" ("POTS"), one twisted wire pair of the telephone cable is connected to the inner pair pins of the RJ11 connector, while the outer pair pins of the RJ11 connector are not further connected to any conductors of the telephone cable. However, once a DSL modem is contemplated as also being connected to the RJ11 connector, there arises the issue of whether to use the outer pair pins to communicate with the DSL modem, or to further re-arrange the connections to use the inner pair pins to communicate with the DSL modem and then the outer pair pins to communicate with a telephone. Further complicating the possibilities is the fact that filtering is also typically required once a DSL modem is to be supported along with a voice telephone device. By way of further background to these considerations, FIGS. 1 through 3 discussed below depict various contemporary alternative connections of an ADSL modem to an RJ11 connector.

FIG. 1 illustrates a first prior art telephone/DSL modem wiring system designated generally at 10. System 10 includes a twisted wire pair $TP_1$ of conductors provided by the telephone company ("TELCO") and connected to a network interface device ("NID") 12. For example, NID 12 is typically enclosed in a box attached to or proximate to the outside of a residential home or business. From NID 12, twisted wire pair $TP_1$ is connected directly to the inner pair of pins $IPP_1$ of an RJ11 receptacle $RJ11_1$. Receptacle $RJ11_1$ is for connecting to an ADSL modem, that is, an RJ11 plug (not shown) on or connected to an ADSL modem may be inserted within RJ11 receptacle $RJ11_1$ to thereby couple the modem to communicate with the TELCO (i.e., with a corresponding modem at the TELCO). Additionally, note that the outer pair of pins $OPP_1$ of RJ11 receptacle $RJ11_1$ are electrically floating. Returning to twisted wire pair $TP_1$ in NID 12, it also is connected to an input of a low pass filter ("LPF") 14, where LPF 14 permits only signals in the POTS frequency to pass, such as those on the order of 4 KHz or less. The output of LPF 14 is connected to the inner pair of pins $IPP_2$ of an RJ11 receptacle $RJ11_2$. Receptacle $RJ11_2$ is for connecting to a POTS telephone, or other device, such as an answering machine or voice modem, operable to communicate along a POTS medium. Specifically, this connection is typically made by inserting an RJ11 plug (not shown) on or connected to the POTS telephone device into RJ11 receptacle $RJ11_2$ to thereby couple the POTS telephone device to communicate with the TELCO. Lastly, note that the outer pair of pins $OPP_2$ of RJ11 receptacle $RJ11_2$ are electrically floating.

The operation of system 10 is now explored. In general, the TELCO provides both POTS and DSL modem communications via twisted wire pair $TP_1$ to NID 12. With respect to DSL modem communications, they are achieved via the direct connection to receptacle $RJ11_1$. Thus, so long as the ADSL modem is connected to inner pins $IPP_1$ of receptacle $RJ11_1$, any appropriate DSL signal may be communicated between the ADSL modem and twisted wire pair $TP_1$. With respect to the POTS communications, they are filtered by LPF 14 and pass to receptacle $RJ11_2$. As a result, note that any relatively high frequency signals (i.e., greater than 4 KHz) on twisted wire pair $TP_1$ do not reach receptacle $RJ11_2$ and, hence, do not reach any POTS telephone device connected to that receptacle. Such filtering is typically required because current POTS devices do not have a defined frequency response for these relatively high frequency signals. Further, LPF 14 thereby eliminates any possibility that operation of the POTS telephone connected to receptacle $RJ11_2$ would then affect the operation of an ADSL modem that is directly-connected to twisted wire pair $TP_1$ via receptacle $RJ11_1$. In any event, so long as the POTS telephone device is connected to inner pins $IPP_2$ of receptacle $RJ11_2$, any appropriate POTS signal may be communicated between the POTS telephone device and twisted wire pair $TP_1$.

While the preceding discussion of system 10 in FIG. 1 demonstrates a straightforward manner of connecting both an ADSL modem and a POTS telephone device to a TELCO twisted wire pair $TP_1$, various drawbacks also may be observed with respect to system 10. As one drawback, the consumer using system 10 must be aware of the limitation that receptacle $RJ11_1$ is for connecting to an ADSL modem and receptacle $RJ11_2$ is for connecting to a POTS telephone device. In other words, if the consumer were to reverse these connections, then a POTS telephone device connected to receptacle $RJ11_1$ may not properly communicate due to the receipt of relatively high frequency signals, and an ADSL modem connected to receptacle $RJ11_2$ would not properly communicate because it would only receive relatively low frequency signals. As another drawback, system 10 operates properly only if both the ADSL modem and the POTS telephone device are configured to communicate along the inner pair of pins of an RJ11 configuration. For a POTS telephone device, this configuration may be likely because many such devices are hard-wired to communicate only along such inner pair pins. However, given the alreadyexpanding competition and development of ADSL technology, some manufacturers may consider providing their ADSL modems with a connection to the outer pair of RJ11 pins rather than the inner pair, such as for reasons further demonstrated below. If such an alternative ADSL modem were connected to receptacle $RJ11_1$, then it would not communicate at all given that outer pins $OPP_1$ of receptacle $RJ11_1$ are electrically floating.

FIG. 2 illustrates a second prior art telephone/DSL modem wiring system designated generally at 20, and which shares some general aspects with system 10 described above. System 20 includes a twisted wire pair $TP_2$ provided by the TELCO and connected to an NID 22. From NID 22, twisted wire pair $TP_2$ is connected directly to the outer pair of pins $OPP_3$ of an RJ11 receptacle $RJ11_3$. For reasons more clear below, RJ11 receptacle $RJ11_3$ is for connecting to either an ADSL modem or a POTS telephone device. Additionally, twisted wire pair $TP_2$ in NID 22 is connected to an input of an LPF 24, where LPF 24 operates in the same manner as LPF 14 of FIG. 1, thereby permitting only signals in the POTS frequency to pass. The output of LPF 24 is connected to the inner pair of pins $IPP_3$ of RJ11 receptacle $RJ11_3$. Given the preceding connections, note that the connection to inner pair $IPP_3$ and outer pair $OPP_3$ may be achieved using a single POTS cable as shown at CB, thereby including two twisted wire pairs between NID 22 and RJ11 receptacle $RJ11_3$.

The operation of system 20 is as follows. The TELCO provides both POTS and DSL modem communications via twisted wire pair $TP_2$ to NID 22. With respect to DSL modem communications, they are achieved via the direct connection from NID 22 to outer pins $OPP_3$ of receptacle $RJ11_3$. Thus, an ADSL modem may be connected via an RJ11 plug to receptacle $RJ11_3$ and thereby properly communicate ADSL communications with the TELCO so long as the ADSL modem is connected to outer pins $OPP_3$ of receptacle $RJ11_3$ rather than to inner pins $IPP_3$ of receptacle $RJ11_3$. Conversely, with respect to the POTS communications, they are achieved via the filtered connection to inner pins $IPP_3$ of receptacle $RJ11_3$. Thus the POTS telephone device may be connected via an RJ11 plug to RJ11 receptacle $RJ11_3$ and may properly communicate POTS communications with the TELCO so long as the POTS telephone device is connected to inner pins $IPP_3$ of receptacle $RJ11_3$ rather than to outer pins $OPP_3$ of receptacle $RJ11_3$.

While the preceding discussion of system 20 in FIG. 2 demonstrates that system 20 supports either an ADSL modem or a POTS telephone communication from receptacle $RJ11_3$, various drawbacks also may be observed with respect to system 20. As one drawback, system 20 operates properly only if the ADSL modem is configured to communicate along the outer pair of pins of an RJ11 configuration and the POTS telephone device is configured to communicate along the inner pair of pins of an RJ11 configuration. Again, given the diverse number of ADSL modems being or to be implemented, there is no assurance that this constraint will be met. As another drawback, for proper operation of both the ADSL modem and the POTS telephone device, system 20 requires that the person who implements its wiring properly terminate each of the four wires at the correct one of either an inner or outer pin; clearly, various reasons may cause an error in such wiring to occur.

FIG. 3 illustrates a third prior art telephone/DSL modem wiring system designated generally at 30. System 30 shares some electrical-connection aspects with system 10 described above while the physical locations of various connections differ in some respects. Turning to system 30, it includes a twisted wire pair $TP_3$ provided by the TELCO and connected to an NID 32. For system 30, however, and as further appreciated below, no additional change is made to NID 32 (e.g., such as a filter) to accommodate an ADSL modem at the home or business corresponding to NID 32. Instead, twisted wire pair $TP_3$ is connected directly to the inner pair $IPP_4$ of pins of an RJ11 receptacle $RJ11_4$. In other words, the connection between NID 32 and RJ11 receptacle $RJ11_4$ is the same as is typically installed to support standard POTS telephone services. However, to further support both POTS telephone service as well as ADSL communications, system 30 further includes a microfilter 34. Microfilter 34 may be physically presented as a relatively small housing, formed of a rigid material such as plastic, and on the order of two to four inches or less in each of its dimensions. Further, as appreciated from the following description of the electrical connections of microfilter 34, it is configured to be placed in-line between RJ11 receptacle $RJ11_4$ and either an ADSL modem or a POTS telephone device.

Looking in detail to the electrical attributes of microfilter 34, it includes an RJ11 plug $RJ11_5$ which is physically shaped to be fitted into RJ11 receptacle $RJ11_4$ as is known in the art. The inner pins $IPP_5$ of RJ11 plug $RJ11_5$ are connected to a twisted wire pair $TP_4$. Twisted wire pair $TP_4$ is connected, within microfilter 34, directly to the outer pair of pins $OPP_6$ of an RJ11 receptacle $RJ11_6$. Additionally, twisted wire pair $TP_4$ is connected, within microfilter 34, to the input of an LPF 36, and an output twisted wire pair $TP_5$ from LPF 36 is connected to the inner pair of pins $IPP_6$ of RJ11 receptacle $RJ11_6$. Lastly, either an ADSL modem or a POTS telephone device may be connected to RJ11 receptacle $RJ11_6$, where such connection may be made by inserting an RJ11 plug (not shown) from either the modem or telephone device into RJ11 receptacle $RJ11_6$. To ensure a proper ADSL communication path, the RJ11 plug of the ADSL modem must communicate along its outer pins to contact and communicate with outer pair of pins $OPP_6$ of RJ11 receptacle $RJ11_6$. Conversely, to ensure a proper POTS telephone communication path, the RJ11 plug of the POTS telephone device must communicate along its inner pins to contact and communicate with inner pair of pins $IPP_6$ of RJ11 receptacle $RJ11_6$. Lastly, while only a single microfilter 34 is shown in system 30, one skilled in the art will recognize that for each RJ11 receptacle wired in the same manner as RJ11 receptacle $RJ11_4$, a corresponding microfilter wired in the same manner as microfilter 34 may be connected to the RJ11 receptacle, and in which case either an ADSL modem or a POTS telephone device may be connected to the microfilter in the same manner as described with respect to microfilter 34. In this latter instance of multiple microfilters, note that under contemporary systems only one of those microfilters should connect to an ADSL modem while the remaining microfilters may connect to POTS telephone devices; this arises from the aspect that under contemporary configurations only a single ADSL modem is generally supported for a single copper pair (i.e., at the site of that copper pair), primarily due to the lack of the ability to share frequencies and negotiate a connection between multiple ADSL modems connected at a single copper pair.

While system 30 of FIG. 3 supports both ADSL modem and POTS telephone communications, it too has drawbacks. For example, different types of microfilters may use different sets of inner or outer pins for either ADSL or POTS telephone service and, thus, a modem or telephone device connected to the microfilter must be configured to communicate using the appropriate corresponding pins. As another example, the microfilter represents a separate piece of equipment that the user must obtain.

As yet further background, the prior art further includes some DSL modems which include a mechanical switch typically attached to a circuit board included within the DSL modem. The mechanical switch is intended for use by a technically-savvy person so that such a person may move the switch to one of two positions, where in a first position the DSL modem is connected to communicate along the inner pair of pins of its RJ11 connector while in a second position the DSL modem is connected to communicate along the outer pair of pins of its RJ11 connector. The movement of this switch, however, is purely manual an is not further facilitated by the modem itself; instead, the person operating the switch is somehow left to independently determine the proper location of the switch in an effort to achieve a proper DSL communication path.

In addition to the preceding, the present inventor has recognized additional observations particularly in view of the developing marketplace. For example, given the level of DSL developments, there is also an increasing need to present DSL technology to the general public in as straightforward a manner as possible. Indeed, it is contemplated that consumers will someday seek to implement DSL modems in a manner at least as straightforward as now used for telephone devices and voice modems. Such an approach may bring a consumer to a local electronics store or otherwise permit the consumer to obtain a DSL modem from some alternative source, where the consumer thereafter desires to couple the modem to his or her computer without the assistance of a technically-educated service representative. However, the many alternatives provided above demonstrate that such a consumer is very unlikely to understand the technical considerations involved or necessary to achieve the specific DSL modem connections in their home or office. Also shown above are various factors that may result in an inoperable installation by a consumer. Thus, to facilitate this type of self-installation, there is a need to simplify the process so as to increase the chances that the installation will operate properly, as is achieved by the present embodiments.

BRIEF SUMMARY OF THE INVENTION

In the preferred embodiment, there is a DSL modem. The DSL modem comprises a connector comprising a first pair of conductors and a second pair of conductors. The DSL modem further comprises both circuitry for transmitting according to a DSL protocol and circuitry for receiving according to a DSL protocol. Still further, the DSL modem comprises switching circuitry operable to selectively switch to a first position to couple the circuitry for transmitting and the circuitry for receiving to the first pair of conductors and to a second position to couple the circuitry for transmitting and the circuitry for receiving to the second pair of conductors. Lastly, the DSL modem comprises circuitry for controlling the switching circuitry to switch to one of the first position and the second position and for then detecting whether DSL service exists along the pair of conductors to which the circuitry for transmitting and the circuitry for receiving is then coupled. Other circuits, systems, and methods are also disclosed and claimed.

DETAILED DESCRIPTION OF THE INVENTION

Figure 1:
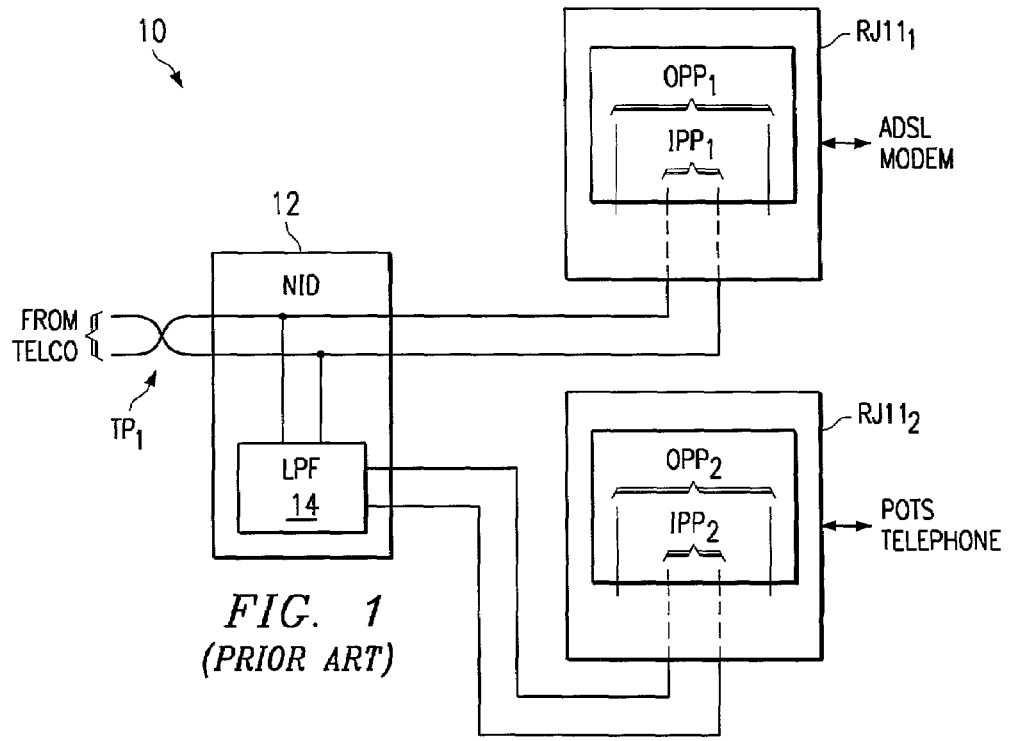
FIG. 1 illustrates a prior art electrical diagram for coupling an ADSL modem to the inner pair of conductors in a first dedicated RJ11 receptacle and for coupling a POTS telephone device to the inner pair of conductors in a second dedicated RJ11 receptacle.
Figure 2:
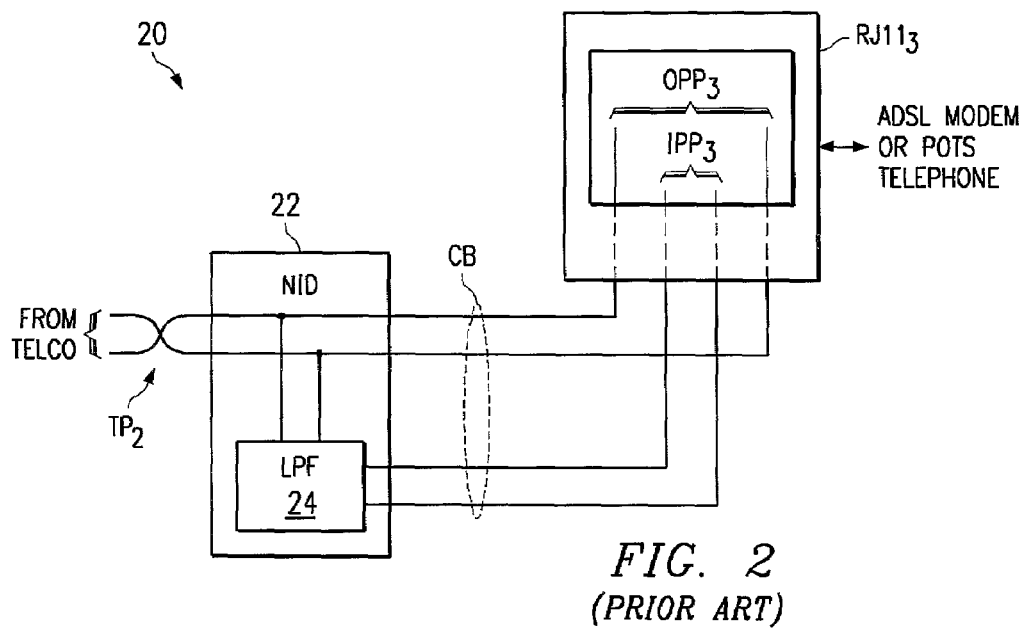
FIG. 2 illustrates a prior art electrical diagram for coupling either an ADSL modem to the outer pair of conductors in an RJ11 receptacle or for coupling a POTS telephone device to the inner pair of conductors in the RJ11 receptacle.
Figure 3:
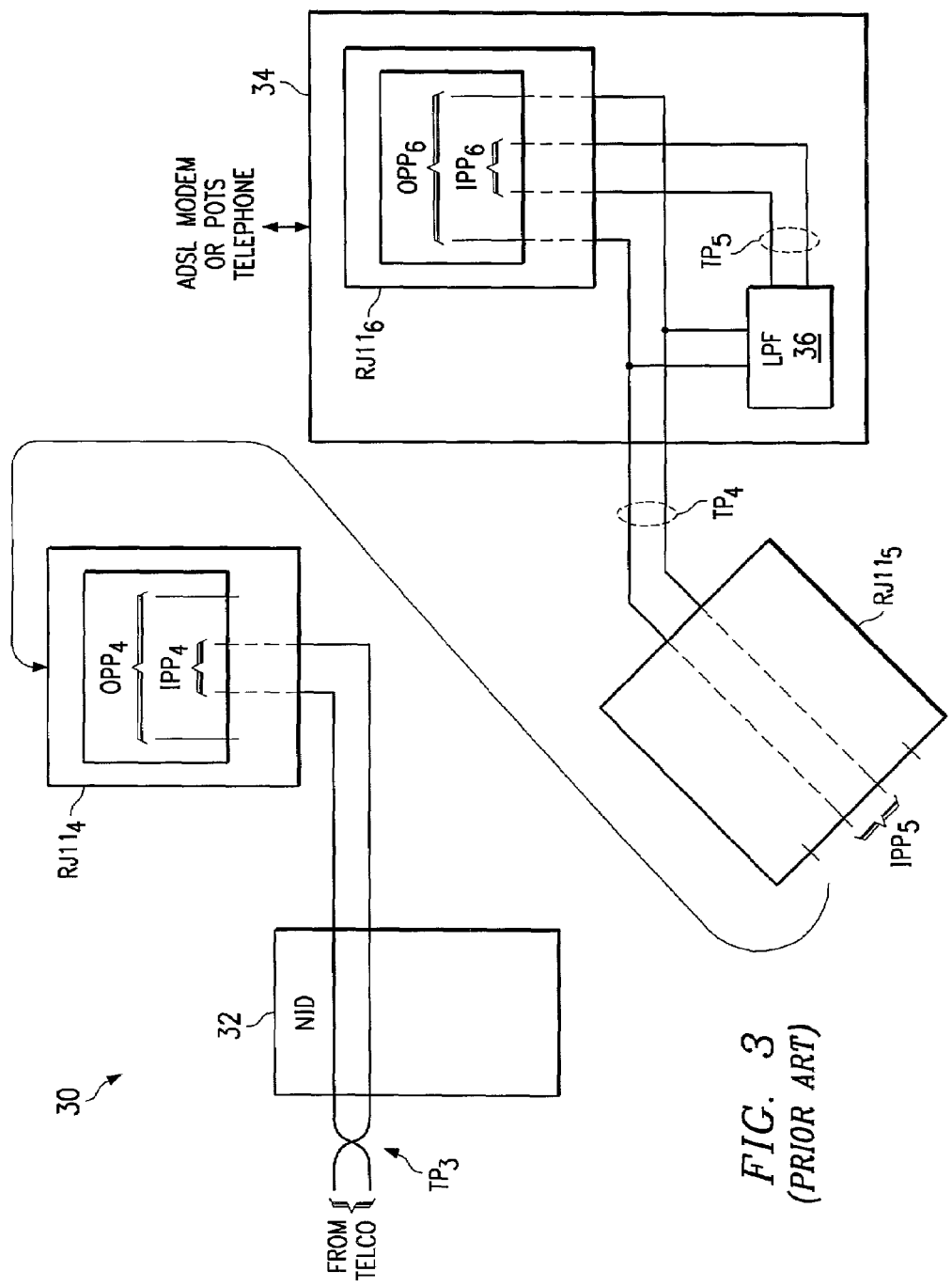
FIG. 3 illustrates a prior art electrical diagram for coupling either an ADSL modem to the outer pair of conductors in an in-line microfilter RJ11 receptacle or for coupling a POTS telephone device to the inner pair of conductors in the in-line microfilter RJ11 receptacle.

FIGS. 1 through 3 were described in the preceding Background Of The Invention section of this document and the reader is assumed to be familiar with that discussion.

Figure 4:
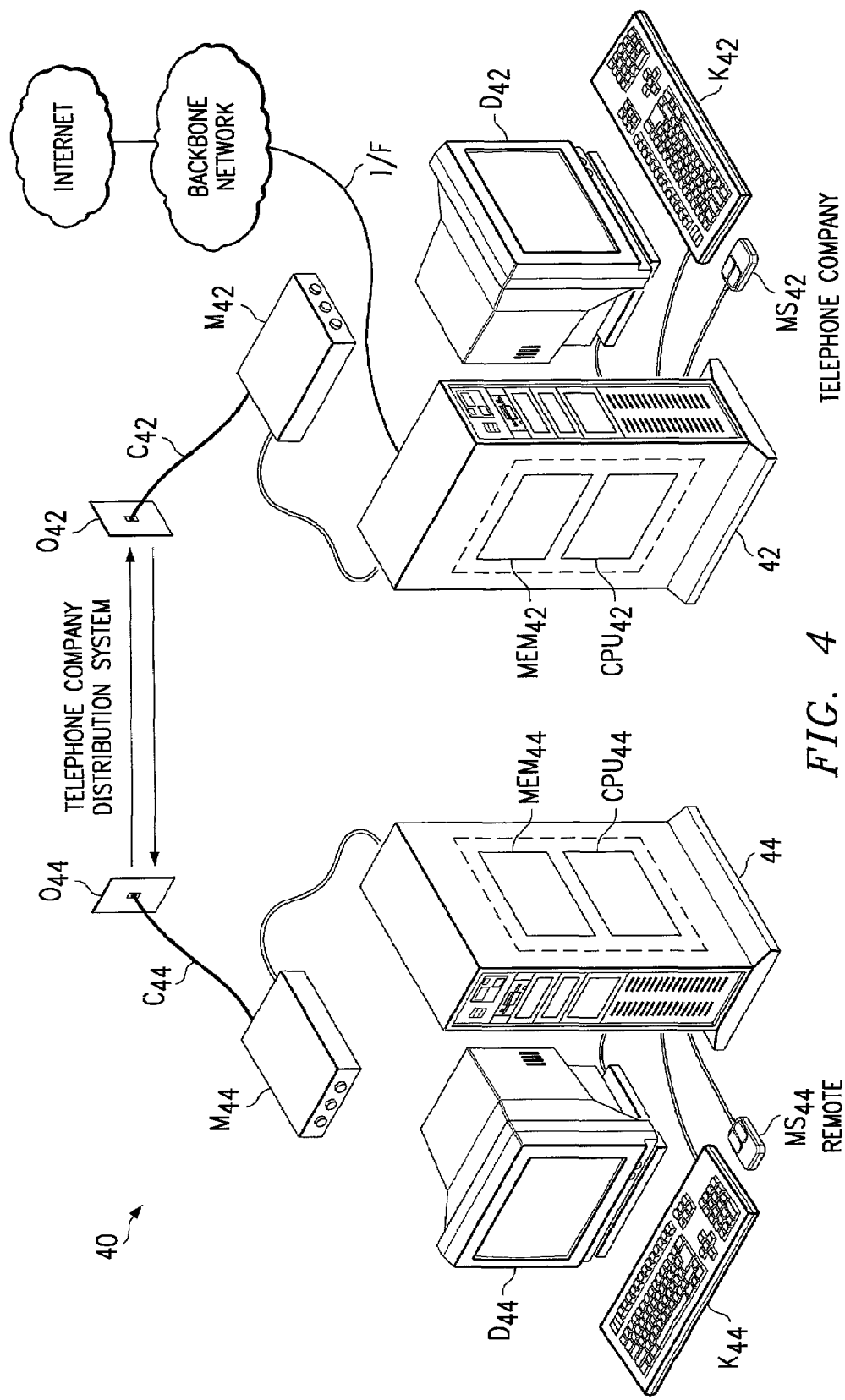
FIG. 4 illustrates a system having a remote computer and a telephone office computer, where each computer is coupled to a modem in which the present inventive embodiments may be implemented.

FIG. 4 illustrates a system 40 depicting by way of example the context in which the present inventive embodiments may be implemented. By way of example, system 40 includes aspects which relate to two different geographic locations, one being a telephone company central office and the other being a location remote from that office. For purposes of appreciating a common example, the remote location may be a home or office of a user in that location while the central office may be any of those types of offices included in a telephone company system. These two locations may be fairly dose together, or vast distances apart, yet they both may benefit from the present embodiments. These benefits as well as the details of the inventive embodiments are presented below.

At a minimum for illustrating the preferred embodiments, each of the central office and the remote location houses a computer 42 and 44, respectively. Computers 42 and 44 may be of any type of known computer configurations and, indeed, the type of computing device at the remote location may well differ from the type or configuration of that used at the central office (e.g., a rack system). Typically, a user of either computer may provide input to a corresponding computer, such as by way of a keyboard K and a mouse MS or other input or pointing device as known in the art. To simplify the present illustration, note for purposes of FIG. 4 that each of the reference identifiers for these items (i.e., K and MS) as well as for other items discussed below further includes a subscript reciting the reference number of the corresponding computer. For example, computer 42 includes keyboard $K_{42}$ and mouse $MS_{42}$. Continuing with this convention and looking to other attributes of computers 42 and 44, each computer preferably includes some device for presenting output to a user, such as a display D in the case of FIG. 4. Internally to each computer may be various circuits including those mounted on circuit boards and/or cards, including a motherboard (shown in phantom) which includes a memory MEM, a central processing unit CPU or more than one such CPU as may likely be the case for host computer 44, and likely other circuitry (not shown). Of particular note to the present embodiments, also coupled to each computer is a DSL modem M so that each of computers 42 and 44 may communicate with one another over a standard telephone company distribution system. The coupling between a DSL modem M and its respective computer 42 or 44 may be achieved in various manners, such as via a network interface card ("NIC") or some other bus connection (e.g., USB). Indeed, it is also contemplated that DSL modems may be implemented as internal modems configured in the manner of a computer card. Further, in the case of computer 42 at the telephone company, note that it is likely to actually support multiple DSL modems, although only one is shown to simplify the illustration as well as the following discussion. Looking to the distribution system along which the modems communicate, it includes twisted conductor pairs accessible for a connection between computers 42 and 44. In this regard, DSL modem $M_{44}$ of computer 44 provides an output which is provided to a standard telephone connector (e.g., RJ11) or other applicable connector and, thus, is connected to a telephone wall outlet $O_{44}$, having such a connector, via a standard telephone communication cable $C_{44}$. This connection permits communication from DSL modem $M_{44}$ over the telephone company distribution system and, therefore, with DSL modem $M_{42}$ of computer 42. Note that while comparable connections using cable $C_{42}$ and outlet $O_{42}$ are shown at the telephone company, more typical industrial type connections may actually exist at that end of the connection. Lastly, given the communications of DSL modems $M_{42}$ and $M_{44}$ with one another, note that in the preferred embodiment such communications are by way of ADSL communications. Such communications may be preferred for various reasons. For example, ADSL communications are growing in popularity and, thus, are likely to be favored in the consumer marketplace. As another example, the preferred embodiment uses part of the ADSL protocol, as detailed later, to support a method of coupling each modem to a corresponding receptacle in a manner that increases the likelihood of a proper connection. Despite these advantages and preferences, however, one skilled in the art will appreciate that many of the present teachings also provide aspects and benefits which may be implemented in other DSL modem categories.

Given system 40 of FIG. 4, it is intended that its components are used within the present inventive scope to accomplish DSL communications between modems $M_{42}$ and $M_{44}$. In this regard, note that computer 42 is connected via an appropriate interface I/F to a backbone network. This network may be of various types, with Ethernet being a popular contemporary example. As a result, computer 42 may communicate with any other device or resource which also is coupled to communicate with the backbone network. Indeed, as one example, FIG. 4 illustrates that the Internet is also coupled to the backbone network through some kind of networking architecture. Consequently, computer 42 may communicate, via the backbone network, with the Internet. Additionally, due to the modem-to-modem communication path between computers 42 and 44, computer 44 may use DSL communications for accessing other media available to computer 42 at the telephone company central office, including the Internet.

Figure 5:
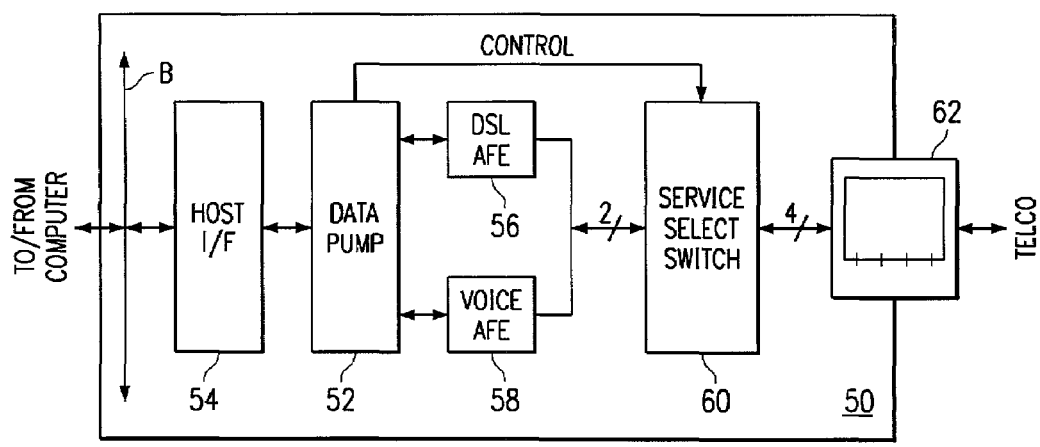
FIG. 5 illustrates a block diagram of a DSL modem according to the preferred embodiment.

FIG. 5 illustrates a block diagram of a DSL modem 50 serving as the preferred embodiment for forming modems $M_{42}$ and $M_{44}$, with it understood that a modem at each site may include some different circuitry based on whether the site is at the service provider or is at a remote modem (e.g., a remote modem such as modem $M_{44}$ may further include certain circuitry for timing recovery while such circuitry is not included on a central office modem such as modem $M_{42}$). Turning now to the specific illustration of FIG. 5, modem 50 includes a data pump 52 for performing various DSL data processing and related functions for modem 50. By way of example, data pump 52 may be implemented using a digital signal processor ("DSP") or more than one DSP. For example, such devices are sold in various forms by Texas Instruments Incorporated. Data pump 52 also preferably includes data storage capability to store both modem data as well as program code to provide programming functionality to data pump 52. By way of example, such programming may include a DSL algorithm for communicating data according to a DMT algorithm. Finally, note that data pump 52 also may support voice modem capabilities.

Looking to the left of FIG. 5, modem 50 includes a bidirectional bus B to couple modem 50 to a computer, such as to one of computers 42 and 44. Bus B may take various forms depending on the manner in which the protocol between the modem and computer is supported, such as through an Ethernet connection, an industry standard architecture ("ISA") bus, or via USB. Further in this regard, bus B is bidirectionally coupled to a host interface circuit 54, where host interface circuit 54 is bidirectionally coupled to data pump 52. Host interface circuit 54 includes circuitry for supporting the implemented protocol, and also may include various other supporting circuits such as temporary data storage (e.g., one or more buffers, such as FIFOs), registers for communicating protocol commands and status information, interrupt circuitry, data routing circuitry, timing circuitry, and so forth as will be ascertainable by one skilled in the art.

Concluding FIG. 5, modem 50 includes two analog front end ("AFE") circuits, namely, a DSL AFE 56 and an optional voice AFE 58, both of which are bidirectionally connected to both data pump 52 and, via a pair of conductors, to a service select switch 60. DSL AFE 56 and voice AFE 58 may be constructed according to various designs ascertainable by one skilled in the art. For example, the circuitry of DSL AFE 56 depends on the preferred DSL type being implemented, such as ADSL in the preferred embodiment, and it includes sufficient circuitry to accommodate the DSL communications such as analog-to-digital and digital-to-analog conversion capabilities. As another example, the circuitry of voice AFE 58 may implement a standard voice modem protocol such as the V.90 protocol known in the voice modem art. Service select switch 60 is constructed as detailed later, and is controlled by data pump 52 via a CONTROL bus. Lastly, service select switch 60 is bidirectionally connected to the four conducting pins of an RJ11 receptacle (or comparable connector) designated generally at 62. RJ11 receptacle 62 is for connecting to the TELCO signal, such as by way of a standard RJ11 cable used for connecting to an RJ11 receptacle in a home or business. Further and for reasons detailed later, this connection also may include an in-line microfilter or other connection, where the operation of service select switch 60 increases the likelihood of a proper DSL communication path being established despite the various different pin configurations of the connector to which RJ11 receptacle 62 is coupled.

Figure 6:
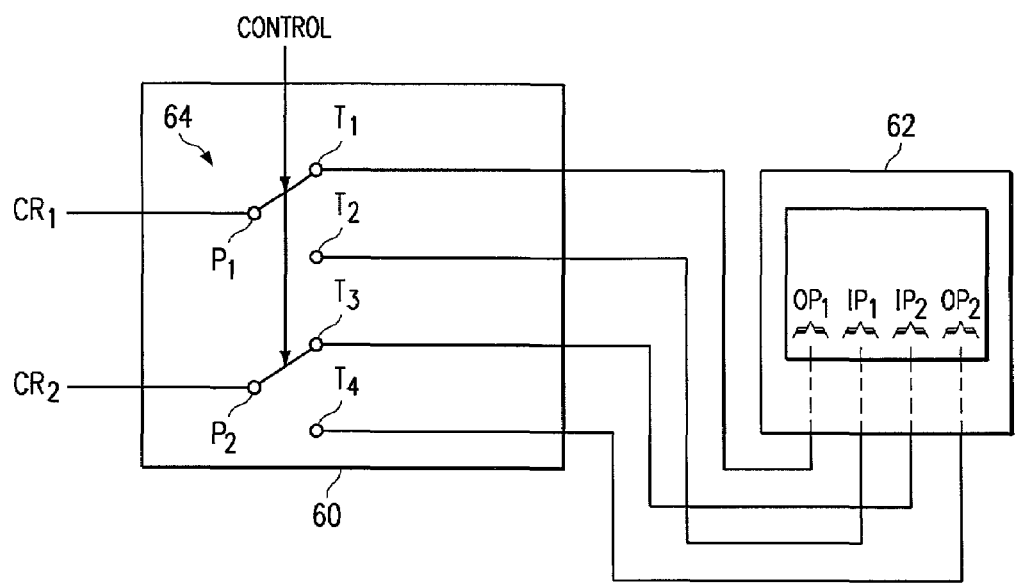
FIG. 6 illustrates an electrical diagram of service select switch 60 and RJ11 receptacle 62 from FIG. 5 in greater detail.

FIG. 6 illustrates an electrical diagram of service select switch 60 and RJ11 receptacle 62, both from FIG. 5, in greater detail. Turning first to service select switch 60, it includes a switch 64 which, in the illustrated embodiment, is an electromechanical switch, that is, it has a mechanical movement which is controlled in response to an electronic signal. Switch 64 includes two poles $P_1$ and $P_2$. Each of poles $P_1$ and $P_2$ is connected to a respective conductor $CR_1$ and $CR_2$, where conductors $C_1$ and $C_2$ are connected to both DSL AFE 56 and voice AFE 58 (see FIG. 5). Pole $P_1$ may be switched to either a terminal $T_1$ or a terminal $T_2$, while concurrently pole $P_2$ may be switched to either a terminal $T_3$ or a terminal $T_4$. More particularly, the concurrent switching in this regard is in response to assertion of the CONTROL signal along the CONTROL bus from data pump 52, as further detailed later. Terminals $T_1$ and $T_3$ are connected to the outer pins of RJ11 receptacle 62 and, more particularly, terminal $T_1$ is connected to outer pin $OP_1$ while terminal $T_3$ is connected to outer pin $OP_2$. Terminals $T_2$ and $T_4$ are connected to the inner pins of RJ11 receptacle 62 and, more particularly, terminal $T_2$ is connected to inner pin $IP_1$ while terminal $T_4$ is connected to inner pin $IP_2$.

Figure 7:
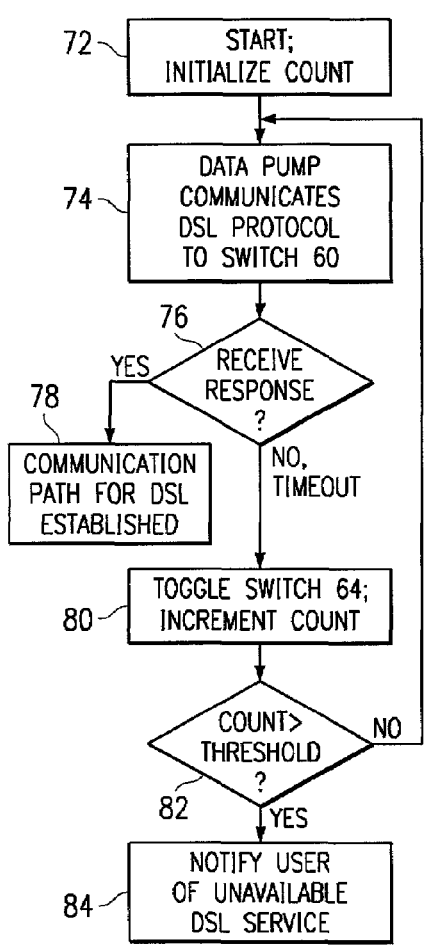
FIG. 7 illustrates a flow chart of a method of operation of the preferred modem and particularly with respect to its service select switch for automatically detecting and establishing a DSL communication path between the modem and the TELCO.

The operation of service select switch 60 and RJ11 receptacle 62 from FIGS. 5 and 6 is now described with further reference to a method 70 shown in FIG. 7. Method 70 begins with a start step 72, where step 72 may be reached in various manners. For example, in one embodiment, step 72 may commence when power is supplied to modem 50 or during system start-up. As another example, a reset button or the like may be provided in connection with modem 50 where a consumer may depress the button to cause step 72 to be reached. As yet another example, a software link could be provided to cause step 72 to be reached. Lastly, in start step 72 a COUNT value is initialized, such as by setting it equal to a value of one. After start step 72, method 70 continues to step 74.

In step 74, modem 50 communicates a known DSL protocol signal, from data pump 52 to DSL AFE 56 and along conductors $CR_1$ and $CR_2$, to service select switch 60. The particular DSL protocol signal is preferably one in which a known response is expected from the TELCO. For example, under the G.994.1 handshake procedures for ADSL transceivers, the known DSL protocol signal communicated by step 74 may be an R-TONES-REQ signal. Further, in the preferred embodiment, service select switch 60 defaults in a first instance to a known position for switch 64; for example, assume for this first instance that switch 64 is in the upward position as shown in FIG. 6. Due to this switch position, the R-TONES-REQ signal is communicated from DSL AFE 56, via conductors $CR_1$ and $CR_2$, to terminals $T_1$ and $T_3$. Further, due to the connection of terminals $T_1$ and $T_3$ to RJ11 receptacle 62, then the R-TONES-REQ signal is therefore communicated to the outer pins (i.e., $OP_1$ and $OP_2$, respectively) of RJ11 receptacle 62. By way of introduction to later steps, therefore, note that if these outer pins are connected to the TELCO, then the R-TONES-REQ signal is thereby communicated to the TELCO. Next, method 70 continues from step 74 to step 76.

In step 76, data pump 52 analyzes the data, if any, received by the same pins along which the protocol was communicated in the immediately-preceding instance of step 74. Particularly, the step 76 analysis determines if an appropriate protocol response is communicated back from the TELCO. In other words, step 76 determines whether a DSL response was received at RJ11 receptacle 62 by the same pair of conductors along which the step 74 DSL communication was sent. For example, when the R-TONES-REQ signal was communicated by step 74 to outer pins $OP_1$ and $OP_2$ of RJ11 receptacle 62, then step 76 determines if a C-TONES signal is received back along those outer pins $OP_1$ and $OP_2$ of RJ11 receptacle 62. Note that this determination may be made by data pump 52 in response to the signals at conductors $CR_1$ and $CR_2$ via DSL AFE 56. If an appropriate protocol response is received, method 70 continues from step 76 to step 78. In contrast, step 76 will await the appropriate protocol response for a timeout period (e.g., ten seconds), and if the appropriate protocol response is not received along the current pair of pins of RJ11 receptacle 62 (e.g., outer pins $OP_1$ and $OP_2$ for the first instance), then method 70 continues from step 76 to step 80.

In step 80, data pump 52 asserts the CONTROL signal along the CONTROL bus to service select switch 60, thereby causing switch 64 to toggle its position. Accordingly, maintaining the preceding example where switch 64 was initially in its upward position as shown in FIG. 5, then upon a first instance of step 80, the asserted CONTROL signal toggles switch 64 downward. In response, therefore, pole $P_1$ is connected to $T_2$ while pole $P_2$ is connected to terminal $T_4$. Consequently, at this point conductors $CR_1$ and $CR_2$ are electrically connected to inner pins $IP_1$ and $IP_2$, respectively, of RJ11 receptacle 62. Additionally, step 80 increments the COUNT value. Next, method 70 continues from step 80 to step 82.

In step 82, data pump 52 determines whether the COUNT value has exceeded a threshold value. As more apparent following the conclusion of the discussion of method 70, by incrementing the value of COUNT in the preceding step 80, there is an indication of the number of times that switch 64 is toggled. This COUNT value therefore also corresponds to repeated instances where step 74 transmitted a DSL protocol signal (e.g., R-TONES-REQ) and the appropriate response was not received. Accordingly, if this event has occurred a relatively large number of times (e.g., ten), then it may be likely concluded that no DSL service is available and desirable to discontinue any additional efforts to transmit the DSL protocol and receive a response. Indeed, if switch 64 is implemented as an electromechanical switch, then the act of toggling it numerous times may result in an undesirable audible chatter. In any event, therefore, the threshold of step 82 is set to the desired relatively large number, and if this threshold is exceeded, method 70 continues from step 82 to step 84. Conversely, if the threshold is not exceeded, then method 70 returns from step 82 to step 74. Both of these alternative paths are discussed immediately below.

In step 84, having been reached because the COUNT value exceeds the step 82 threshold, then a notification is issued to the user of modem 50 that DSL service is not available at the receptacle to which the modem has been connected (assuming that such a physical connection has occurred). The notification may be provided in various manners. For example, data pump 52 may provide a notification via a software link to the computer coupled to modem 50, and the computer may respond with either or both of a display warning or an audible warning. Alternatively, some type of notification element may be physically incorporated within modem 50, such as a light or audible device so as to notify the user that the modem was incapable of detecting a DSL service on either pair of pins of RJ11 receptacle 62.

Looking now to the instance of a return to step 74 following step 82, modem 50 again communicates the known DSL protocol signal from data pump 52 to service select switch 60. At this point, however, and due to the previous operation of step 80, the present communication of the known DSL protocol signal will be an instance wherein switch 64 has been toggled to the opposite location of that from previous first instance of step 74. Thus, for the second instance of step 74, the known DSL protocol signal is connected to a different pair of pins in RJ11 receptacle 62 as compared to the first instance of step 74, and in the present example, this second instance communicates the known DSL protocol signal to inner pins $IP_1$ and $IP_2$ of RJ11 receptacle 62. Following this second instance of step 74, again method 70 continues to step 76.

When step 76 is reached after the second instance of step 74, data pump 52 now analyzes the data, if any, received by the same pins along which the DSL protocol was communicated by the second instance of step 74. In other words, because the DSL protocol in the second instance of step 74 was communicated to inner pins $IP_1$ and $P_2$ of RJ11 receptacle 62, then the current (i.e., second) instance of step 76 determines if an appropriate protocol response is communicated back from the TELCO along inner pins $IP_1$ and $IP_2$ of RJ11 receptacle 62. Once more, the flow after step 76 continues in the manner described above, thereby proceeding to step 80 if the proper DSL response is not received, or proceeding to step 78 if a proper DSL response is received.

From the preceding, one skilled in the art will appreciate that step 78 is reached only if a proper DSL communication is received by a pair of pins of RJ11 receptacle 62 in response to a DSL request being sent along that same pair of pins. Further, if step 78 is reached, switch 64 is maintained in its then-current position, and additional DSL communications may occur between modem 50 and the TELCO using the current position of switch 64. In other words, when step 78 is reached, method 70 has automatically detected DSL service availability from the TELCO along the conductive path then-existing due to the position of switch 64. As a possible addition in the preferred embodiment, the current position of switch 64 may be stored in a memory (e.g., non-volatile memory) either within or outside of data pump 52, and if method 70 is later restarted (e.g., after a power down and up of modem 50) then the stored position may be used to place switch 64 in that stored position for the next instance of steps 74 and 76.

Having demonstrated the preferred embodiment and its operation as shown in method 70 of FIG. 6, one skilled in the art may readily appreciate that the preferred embodiment will automatically establish a DSL communication path for each of the alternative prior art wiring configurations in FIGS. 1 through 3, or an appropriate notification will be provided if not DSL service is available. For example with reference to FIG. 1, if modem 50 were connected via a standard twisted pair connector to receptacle $RJ11_1$, then either in response to an initial setting of switch 64 or after a toggling of that setting, DSL service would be detected along inner pin pair IPP, and modem 50 would be connected thereto by switch 64. Further, if modem 50 were connected via a standard twisted pair connector to receptacle $RJ11_2$, then DSL service would not be detected on either the inner or outer pair of pins for that receptacle, and the user would be informed of the lack of available DSL service. As an example with reference to FIG. 2, if modem 50 were connected via a standard twisted pair connector to receptacle $RJ11_3$, then either in response to an initial setting of switch 64 or after a toggling of that setting, DSL service would be detected along outer pin pair $OPP_3$ and modem 50 would be connected thereto by switch 64. Finally with reference to FIG. 3, if modem 50 were connected via a standard twisted pair connector to microfilter 34 (i.e., to its receptacle $RJ11_6$), then either in response to an initial setting of switch 64 or after a toggling of that setting, DSL service would be detected along outer pin pair $OPP_6$ and modem 50 would be connected thereto by switch 64.

Figure 8:
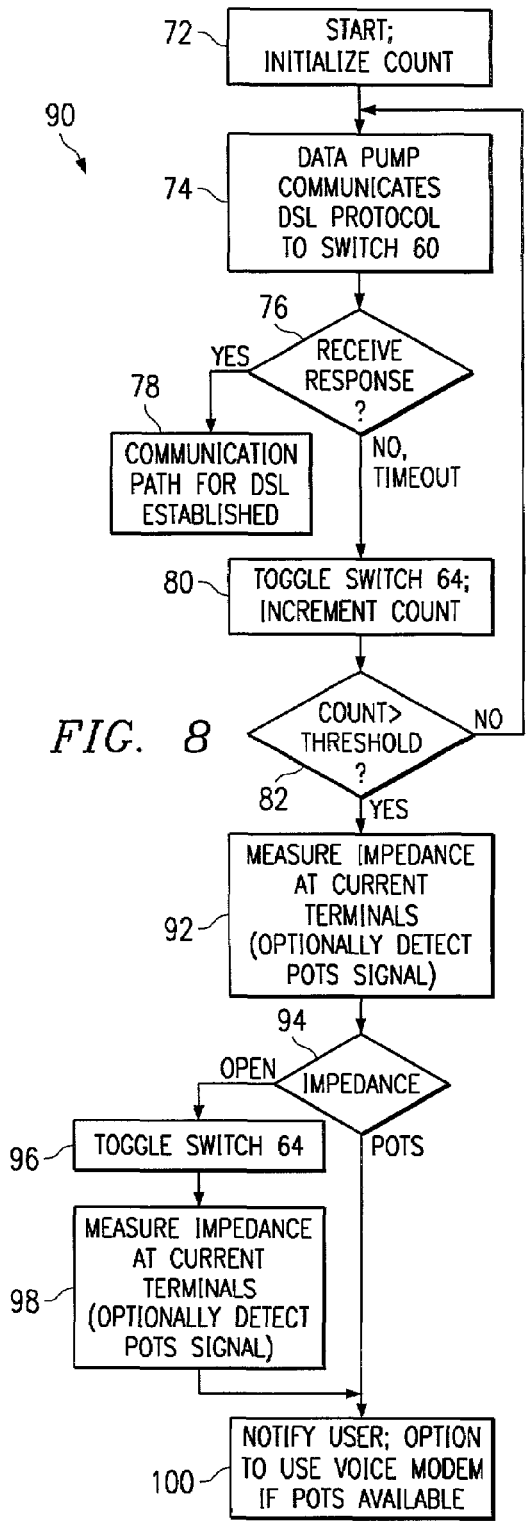
FIG. 8 illustrates a flow chart of an alternative method of operation of the preferred modem whereby the modem is operable to establish a voice modem communication path in response to detecting that DSL service is unavailable.

FIG. 8 illustrates an alternative embodiment of operation of modem 50 and designated generally at 90. Method 90 includes many of the steps of method 70 from FIG. 7 and, thus, the same reference numerals for those steps are carried forward to FIG. 8. As a modification, however, note that the method flow following an affirmative finding in step 82 is to a new series of steps 92 through 100. Thus, this modification is invoked in the instance that switch 64 has been toggled back and forth a sufficient number of times such that the COUNT exceeds the threshold of step 82, and DSL service has not been detected. At this point, method 90 continues to step 92. Before detailing step 92 and subsequent steps, however, note by way of introduction that the alternative of method 90 further addresses the possibility that while DSL service is not available, the receptacle to which modem 50 has been connected may provide POTS service. This aspect is further appreciated below.

In step 92, data pump 52 performs an impedance measurement provided by the pair of pins to which switch 64 is then-connected (i.e., based on whether switch 64 is either in its upward or downward position). In other words, due to the then-current location of switch 64, the impedance test measures the impedance of the circuitry, if any, coupled externally to RJ11 receptacle 62. In the preferred embodiment, the impedance measurement may be made using a selected upstream tone and by evaluating the response to the tone. Following step 92, method 90 continues to step 94.

Step 94 directs further flow in method 90 based on the measured impedance from step 94. For example, if the result of this measurement indicates a relatively large impedance, then such an indication likely represents an open circuit; thus, this finding is likely representative that the pins of RJ11 receptacle 62, from which the impedance measurement was made given the position of switch 64, are likely not connected to any type of service. In this case, method 90 continues from step 94 to step 96. Alternatively, if the present pins to which switch 64 are attached are connected to a low pass filter, then the impedance measurement should recognize the impedance of such a filter; further, this finding is likely representative that the pins of RJ11 receptacle 62, from which the impedance measurement was made given the position of switch 64, are likely connected to a low pass filter which is further connected to a POTS service (e.g., such as inner pin pair $IPP_2$ of RJ11 receptacle $RJ11_2$ in FIG. 1). In this alternative case, method 90 continues from step 94 to step 100.

In step 96, having been reached due to a relatively high impedance measurement in step 94, data pump 52 asserts the CONTROL signal (along the CONTROL bus) to again cause switch 64 to toggle its position. Thus, with a first impedance measurement having occurred in step 92 for a first position of switch 64, the operation of step 96 causes switch 64 to move to its other position. Next, method 90 continues from step 96 to step 98.

Step 98 operates in the same manner as step 92, that is, data pump 52 performs an impedance measurement. However, note here that due to the operation of the immediately-preceding step 96, the impedance measurement of step 98 is for the opposing pair of pins as those involved in step 92. Thus, step 98 again measures the impedance of the load on RJ11 receptacle 62, and again using the same technique described above with respect to step 92 (e.g., using a high frequency tone and the response thereto). Next, method 90 continues from step 98 to step 100.

In step 100, the user is notified in response to the earlier-taken impedance measurements. Specifically, from the preceding one skilled in the art will appreciate that step 100 may be reached either following step 94 in response to an impedance measurement indicating connection of RJ11 receptacle 62 to a low pass filter, or following step 98 in response to an impedance measurement indicating connection of RJ11 receptacle 62 to either a low pass filter or to a relatively high impedance (e.g., open circuit). Accordingly, step 100 responds based on these possibilities. Specifically, if step 100 is reached following detection of a low pass filter, then the user is notified that modem 50 is likely connected, via RJ11 receptacle 62, to a POTS service. Indeed, recalling now that modem 50 further include a voice AFE 58 and that data pump 52 supports voice modem operations, then the user may be given the option to establish a voice modem connection using those pins in RJ11 receptacle 62 along which the low pass filter was detected. Indeed, as DSL modems become more readily implemented in mobile computers, this option may prove very useful where a computer user in some instances has access to an RJ11 receptacle supporting DSL service while in other instances has access to an RJ11 receptacle supporting only POTS service. Alternatively, if step 100 is reached following detection of only a high impedance (on both sets of pins of RJ11 receptacle 62), then the user may be so informed such as by way of display D, an audible tone or message, or both. Lastly, note that method 90 may be further modified where steps 92 and 98 are enhanced to specifically detect a POTS service rather than only measuring impedance. For example, the connections provided via switch 64 may be evaluated to determine if they provide the types of signals provided by a POTS service, where additional hardware may be required on modem 50 to make this type of determination. In any event, if such additional capability is included, then step 100 again may notify the user of the availability of POTS service if such service is detected, and also provide the user the opportunity to establish a voice modem connection thereto.

From the above, it may be appreciated that the above embodiments provide numerous advantages over the prior art For example, with the improvements to modem 50, a consumer may connect an RJ11 receptacle of modem 50, via a standard RJ11 cable, to an RJ11 receptacle in the user's home or business (or other location), and the modem will automatically detect and provide a communication path to the DSL service if such a service is provided by the home/business RJ11 receptacle. Further, the operations of automatic detection and connecting should occur regardless of which pair of pins in the home/business RJ11 receptacle provide the DSL service. As yet another example, the preferred embodiment notifies the consumer if the home/business RJ11 receptacle does not provide DSL service, and also may notify the user if POTS service is instead provided by that receptacle. Accordingly, from these advantages there is the further advantage that a modem according to the preferred embodiment may properly establish DSL communications by being coupled to one of various different RJ11 receptacle wiring configurations, including those connected through microfilters. Still further, the preferred embodiments operate to facilitate a DSL connection with a reduced amount of technical understanding by the user, and thereby facilitate a greater penetration into the consumer marketplace. As yet a final advantage of the preferred embodiments, while the present embodiments have been described in detail, various substitutions, modifications or alterations could be made to the descriptions set forth above without departing from the inventive scope. Many examples of such flexibility have been set forth above. Still further examples also exist For example, while service select switch 60 is shown to include a mechanical switch, in an alternative embodiment an electronic switch (e.g., semiconductor and/or transistor based) may be used. As another example, while the preferred embodiment implements an ADSL modem, other DSL modems may benefit from the present teachings. As still another example, while the R-TONES-REQ signal has been shown as a preferred signal communicated by the data pump and a C-TONES has been shown as a preferred response received by the data pump, other signals may be used. As yet another example, while modem 50 has been shown to include both DSL and voice functionality, in an alternative embodiment only the DSL functionality need be supported. As still another example, while an incrementing COUNT is implemented above to limit the number of DSL connection attempts in method 70, a timeout feature could be used as an alternative. As still another example, while an RJ11 connector using only four pins has been described as the connector to which modem 50 is connected, an RJ11 connector using six pins also may implement the inventive teachings, where by way of example those six pins may be categorized as three different pairs of pins, and the method described earlier may be expanded and applied to this configuration whereby each of the three different pairs of pins are alternately selected via a switch and a determination is then made for each pin pair as to whether a response is received (or whether a POTS signal exists or whether a measured impedance provides a basis for evaluating connectivity). Indeed, as yet a final example, still other connectors providing a DSL service and/or with a different pin configuration also may benefit from the above-described teachings. Thus, these as well as other examples ascertainable by one skilled in the art further exemplify the inventive scope, as is defined by the following claims.

The invention claimed is:

1. A DSL modem, comprising:
   a connector comprising a first pair of conductors and a second pair of conductors;
   circuitry for transmitting according to a DSL protocol;
   circuitry for receiving according to a DSL protocol;
   switching circuitry operable to selectively switch to a first position to couple the circuitry for transmitting and the circuitry for receiving to the first pair of conductors and to a second position to couple the circuitry for transmitting and the circuitry for receiving to the second pair of conductors; and
   circuitry for controlling the switching circuitry to switch to one of the first position and the second position and for then detecting whether DSL service exists along the pair of conductors to which the circuitry for transmitting and the circuitry for receiving is then coupled,
   wherein the circuitry for detecting detects whether DSL service exists in response to a DSL transmission provided by the circuitry for transmitting and in response to a DSL received signal receiving by the circuitry for receiving.

2. The DSL modem of claim 1:
   wherein in a first instance the circuitry for controlling the switching circuitry controls the switching circuitry to switch to the first position and detects whether DSL service exists along the first pair of conductors; and
   wherein in response to detecting that DSL service does not exist along the first pair of conductors, then in a second instance the circuitry for controlling the switching circuitry controls the switching circuitry to switch to the second position.

3. The DSL modem of claim 2 wherein in the second instance the circuitry for detecting detects whether DSL service exists along the second pair of conductors.

4. The DSL modem of claim 3 and further comprising circuitry for notifying a user if DSL service does not exist along both the first pair of conductors and the second pair of conductors.

5. The DSL modem of claim 3 and further comprising:
circuitry for transmitting according to a voice modem protocol;
circuitry for receiving according to a voice modem protocol; and
circuitry for coupling both the circuitry for transmitting according to a voice modem protocol and the circuitry for receiving according to a voice modem protocol to one of the first and second pairs of conductors in response to detecting that DSL service does not exist along both the first pair of conductors and the second pair of conductors.

6. The DSL modem of claim 5 wherein the circuitry for coupling both the circuitry for transmitting according to a voice modem protocol and the circuitry for receiving according to a voice modem protocol to one of the first and second pairs of conductors is responsive to an impedance measurement taken along at least one of the first and second pairs of conductors.

7. The DSL modem of claim 5 wherein the circuitry for coupling both the circuitry for transmitting according to a voice modem protocol and the circuitry for receiving according to a voice modem protocol to one of the first and second pairs of conductors is responsive to detecting a POTS service along at least one of the first and second pairs of conductors.

8. The DSL modem of claim 1 wherein the circuitry for controlling the switching circuitry controls the switching circuitry to toggle between the first position and the second position a plurality of times, and for each toggle operate the circuitry for detecting detects whether DSL service exists along the pair of conductors to which the circuitry for transmitting and the circuitry for receiving is then coupled.

9. The DSL modem of claim 8 and further comprising circuitry for limiting a number of times that the switching circuitry is toggled.

10. The DSL modem of claim 1 wherein the switching circuitry comprises an electromechanical switch.

11. The DSL modem of claim 1, wherein the DSL transmission comprises a R-TONES-REQ signal.

12. The DSL modem of claim 1, wherein the DSL received signal comprises a C-TONES signal.

13. The DSL modem of claim 1:
wherein the DSL transmission comprises a R-TONES-REQ signal; and
wherein the DSL received signal comprises a C-TONES signal.

14. The DSL modem of claim 1:
and further comprising a DSL analog front end circuit;
wherein the DSL analog front end circuit is coupled between the connector and the circuitry for transmitting; and
wherein the DSL analog front end circuit is coupled between the connector and the circuitry for receiving.

15. The DSL modem of claim 1 wherein the circuitry for transmitting and receiving comprises a digital signal processor.

16. The DSL modem of claim 1 wherein the circuitry for controlling the switching circuitry and the circuitry for transmitting and receiving comprises a digital signal processor.

17. The DSL modem of claim 1 wherein the connector comprises an RJ11 type connector.

18. The DSL modem of claim 17:
wherein the first pair of conductors comprises an inner pair of pins; and
wherein the second pair of conductors comprises an outer pair of pins.

19. The DSL modem of claim 17:
wherein the first pair of conductors comprises an outer pair of pins; and
wherein the second pair of conductors comprises an inner pair of pins.

20. The DSL modem of claim 1 wherein the switching circuitry comprises an electronic switch.

* * * * *